(12) United States Patent
Fultz et al.

(10) Patent No.: US 7,791,670 B2
(45) Date of Patent: Sep. 7, 2010

(54) METHOD OF OPERATION FOR A VISION-BASED OCCUPANT SENSING SYSTEM

(75) Inventors: William W. Fultz, Carmel, IN (US); Michael R Meier, Walled Lake, MI (US); Ronald M. Taylor, Greentown, IN (US); Thomas L. Voreis, Noblesville, IN (US); Robert K Constable, Kokomo, IN (US); George J. Noland, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 1519 days.

(21) Appl. No.: 11/126,606

(22) Filed: May 11, 2005

(65) Prior Publication Data

US 2006/0256197 A1    Nov. 16, 2006

(51) Int. Cl.
*H04N 5/238* (2006.01)
*H04N 7/18* (2006.01)
(52) U.S. Cl. .................... 348/366; 348/148
(58) Field of Classification Search ............ 348/40, 348/335, 366, 148, 362, 363, 364
See application file for complete search history.

(56) References Cited

U.S. PATENT DOCUMENTS

| | | | | |
|---|---|---|---|---|
| 5,531,472 | A * | 7/1996 | Semchena et al. | 280/735 |
| 5,742,340 | A * | 4/1998 | Alves | 348/255 |
| 6,005,958 | A * | 12/1999 | Farmer et al. | 382/103 |
| 6,469,289 | B1 * | 10/2002 | Scott-Thomas et al. | 250/208.1 |
| 6,578,869 | B2 * | 6/2003 | Zayan et al. | 280/735 |
| 6,693,670 | B1 | 2/2004 | Stark | |
| 6,810,133 | B2 * | 10/2004 | Khairallah et al. | 382/104 |
| 7,003,384 | B2 * | 2/2006 | Luo et al. | 701/36 |
| 7,123,747 | B2 * | 10/2006 | Wallace et al. | 382/104 |
| 7,233,354 | B2 * | 6/2007 | Voss et al. | 348/308 |
| 7,283,901 | B2 * | 10/2007 | Luo et al. | 701/45 |
| 7,303,126 | B2 * | 12/2007 | Patel et al. | 235/454 |

(Continued)

FOREIGN PATENT DOCUMENTS

EP    0680205    11/1995

(Continued)

OTHER PUBLICATIONS

European Search Report dated Oct. 10, 2006.

*Primary Examiner*—John M Villecco
(74) *Attorney, Agent, or Firm*—Thomas N. Twomey

(57) ABSTRACT

Image processing parameters of an imaging chip in a vision-based occupant sensing system are adjusted for each frame based on ambient illumination responsive information obtained in the idle period preceding that frame. The same sensing data is also used to determine if active illumination is needed to supplement existent ambient illumination during the ensuing image acquisition interval. The inter-frame ambient illumination is detected with an external light sensor or with selected pixels of the imaging chip, and the information is used to calculate and set the gain and integration time of the imaging chip. In applications where the resolution of the imaging chip significantly exceeds the resolution required for occupant sensing, intensity data from one or more otherwise inactive pixels is averaged with the intensity data from the normally active pixels to adapt the sensitivity of the imaging chip to changing ambient illumination.

9 Claims, 3 Drawing Sheets

U.S. PATENT DOCUMENTS

| | | |
|---|---|---|
| 7,308,349 B2 * | 12/2007 | Kong et al. .................. 701/45 |
| 2003/0103141 A1 | 6/2003 | Bechtel et al. |
| 2004/0141079 A1 | 7/2004 | Yamaguchi et al. |
| 2007/0058862 A1 * | 3/2007 | Meier et al. ................ 382/170 |

FOREIGN PATENT DOCUMENTS

| | | |
|---|---|---|
| EP | 0 748 114 | 12/1996 |
| EP | 1 280 341 | 1/2003 |
| EP | 1414243 | 4/2004 |
| EP | 1 566 311 | 8/2005 |
| WO | 03067874 | 8/2003 |
| WO | WO 2004075105 A2 * | 9/2004 |
| WO | 2005/032126 | 4/2005 |

* cited by examiner

METHOD OF OPERATION FOR A VISION-BASED OCCUPANT SENSING SYSTEM

TECHNICAL FIELD

The present invention is directed to vision-based occupant sensing in a motor vehicle, and more particularly to a method of adjusting the operation of a solid-state imaging device to account for changes in ambient lighting.

BACKGROUND OF THE INVENTION

Occupant sensing systems are commonly used in motor vehicles for purposes of determining if pyrotechnically deployed restraints such as air bags should be deployed in the event of sufficiently severe crash. Early systems relied exclusively on sensors for measuring physical parameters such as seat force, but vision-based systems have become economically attractive due to the advent of low-cost solid-state imaging chips. Also, the required image capture rate is relatively low (one frame per second, for example) compared to most imaging applications, allowing adequate sensing performance with limited memory and image processing capability. However, lighting conditions in a vehicle passenger compartment can change significantly from frame to frame with such slow image capture rates, and it is important to ensure that the captured images always remain within the dynamic range of the imaging chip. This problem can be addressed in part by actively illuminating the region of interest with an array of infrared LEDs, for example, but the required LED power consumption can be a significant drawback. Accordingly, it is preferable to minimize the use of active illumination, and to adapt to ambient illumination changes in some other way, while preserving the cost benefits associated with limited memory size and image processing capability.

SUMMARY OF THE INVENTION

The present invention is directed to an improved method of operation for a vision-based occupant sensing system including a solid-state imaging chip, where image processing parameters of the imaging chip are adjusted for each frame based on ambient illumination responsive information obtained in the idle period preceding that frame. The same sensing data is also used to determine if active illumination is needed to supplement existent ambient illumination during the ensuing image acquisition interval. In a first embodiment, an external light sensor detects the inter-frame ambient illumination, and the information is used to calculate and set the gain and integration time of the imaging chip. In a second embodiment, selected pixels of the imaging chip are used to detect the inter-frame ambient illumination. After the image is captured, its dynamic range is evaluated, and deviations from the desired dynamic range are fed back to the gain and integration time calculations. In applications where the resolution of the imaging chip significantly exceeds the resolution required for occupant sensing, intensity data from one or more otherwise inactive pixels disposed in proximity to normally active pixels is averaged with the intensity data from the normally active pixels to effectively adapt the sensitivity of the imaging chip to changing ambient illumination, further reducing active illumination requirements.

DESCRIPTION OF THE PREFERRED EMBODIMENT

Figures 1, 4:
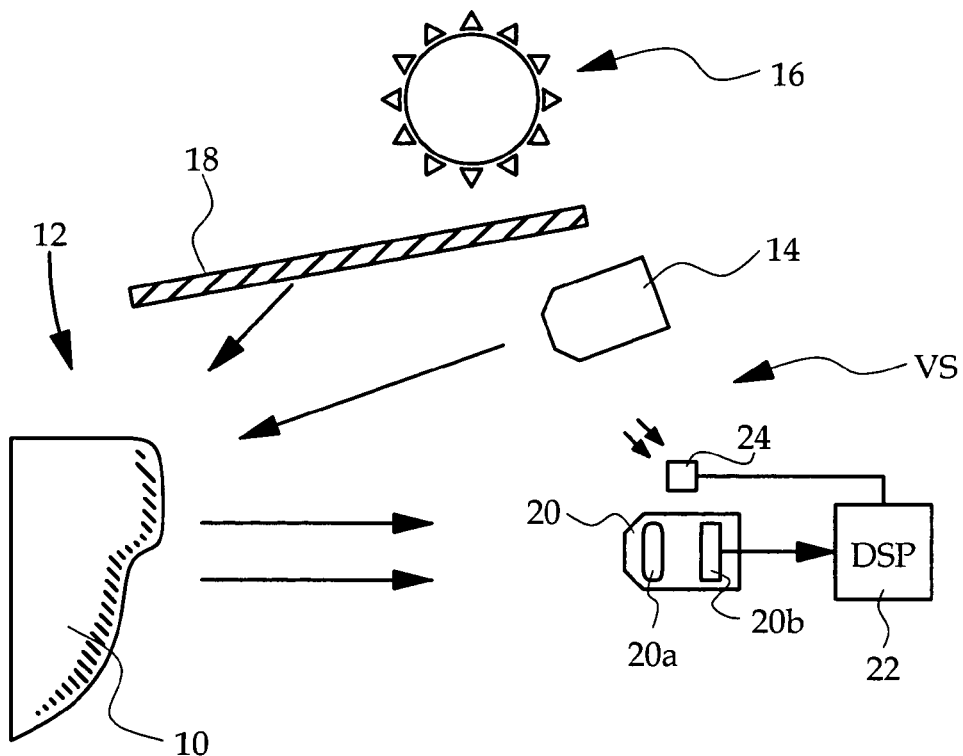
FIG. 1 is a diagram of a vehicle passenger compartment and occupant sensing system, including a solid-state imaging device, an active illumination source, and a microprocessor-based signal processor (DSP).
FIG. 4 is a pixel diagram of the solid-state imaging device of FIG. 1.

Referring to FIG. 1, the reference numeral 10 generally designates an object 10 of interest in a vehicle passenger compartment 12. The object 10 is illuminated by both an active light source 14 and an ambient light source, as designated by the sun 16. The active light source 14 may be one or more light-emitting-diodes that emit light in a visible or near-infrared wavelength band from a location such as in the compartment headliner or the interior rear-view mirror. The ambient light source may be solar as indicated, or may emanate from other sources such as roadside lights, and typically enters the compartment 12 through a window 18.

A vision system VS includes the active light source 14, a digital camera (DC) 20 and a microprocessor-based digital signal processor (DSP) 22. Active and ambient light reflected from object 10 is detected and imaged by digital camera 20, which typically includes an imaging lens 20a and solid-state imager chip 20b. The imager chip 20b is a multi-pixel array that is responsive to the impinging light content, and creates an image of interest. The DSP 22 typically functions to identify items of interest in the imaged scene, such as occupants or infant car seats. For example, DSP 22 can be programmed to recognize the presence of a seat occupant, to classify the occupant, and possibly to determine the position of a recognized occupant relative to an air bag deployment zone.

Figure 2:
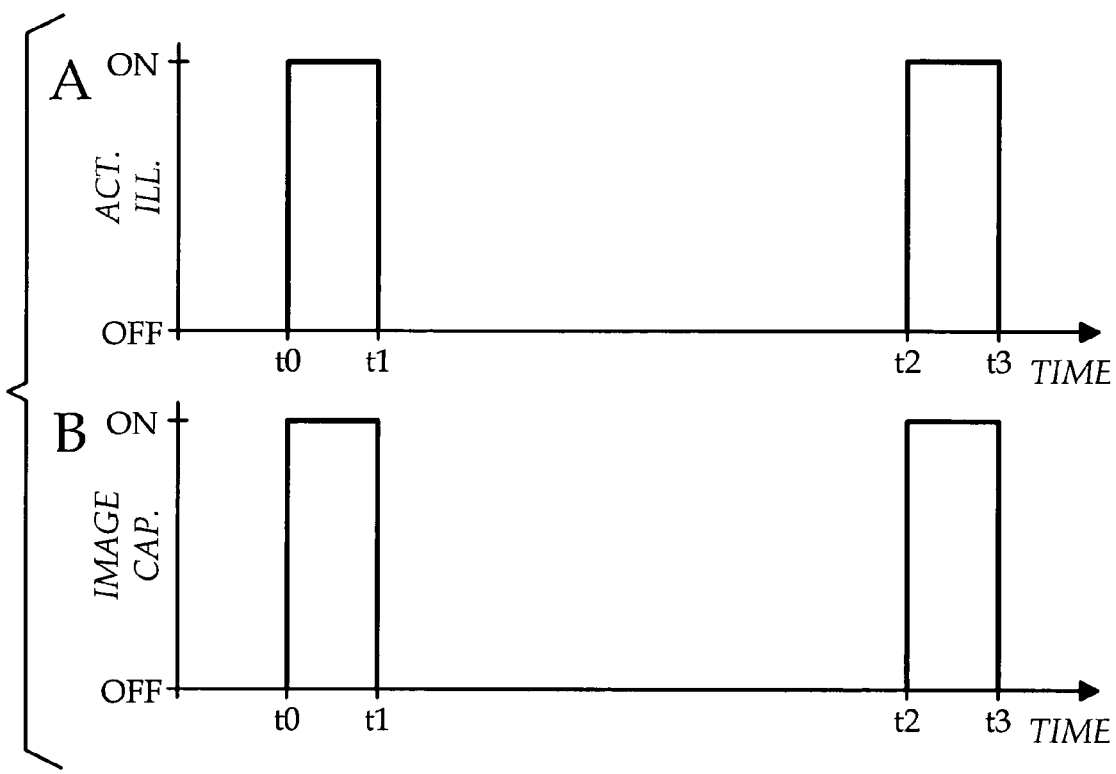
FIG. 2 is a timing diagram for the system of FIG. 1. Graph A depicts the activation state of the active illumination source, and Graph B depicts the image capture and idle intervals of the solid-state imaging device.

In general, commercially available imager chips are designed to support video applications where thirty or more digital images or frames are produced every second. However, much slower image rates are sufficient for occupant detection and classification systems such as described above in reference to FIG. 1. By limiting the image rate to one frame per second, for example, the memory capacities and processing capabilities of DSP 22 can be minimized for low system cost. In the system of FIG. 1, for example, DSP 22 periodically captures image data produced by imager chip 20b during brief image capture intervals (such as 100 ms) that are separated by idle intervals of 900 ms or more. Also, the active light source 14 can be turned off during the idle intervals to minimize power consumption and/or component cost. This technique is illustrated in the timing diagram FIG. 2, where Graph A depicts the activation state of light source 14 and Graph B depicts the image capture and idle intervals of imager chip 20b. Referring to FIG. 2, the image capture intervals occur between time t0 and t1, and between times t2 and t3. The intervening interval t1-t2 is an idle interval.

Figure 3:
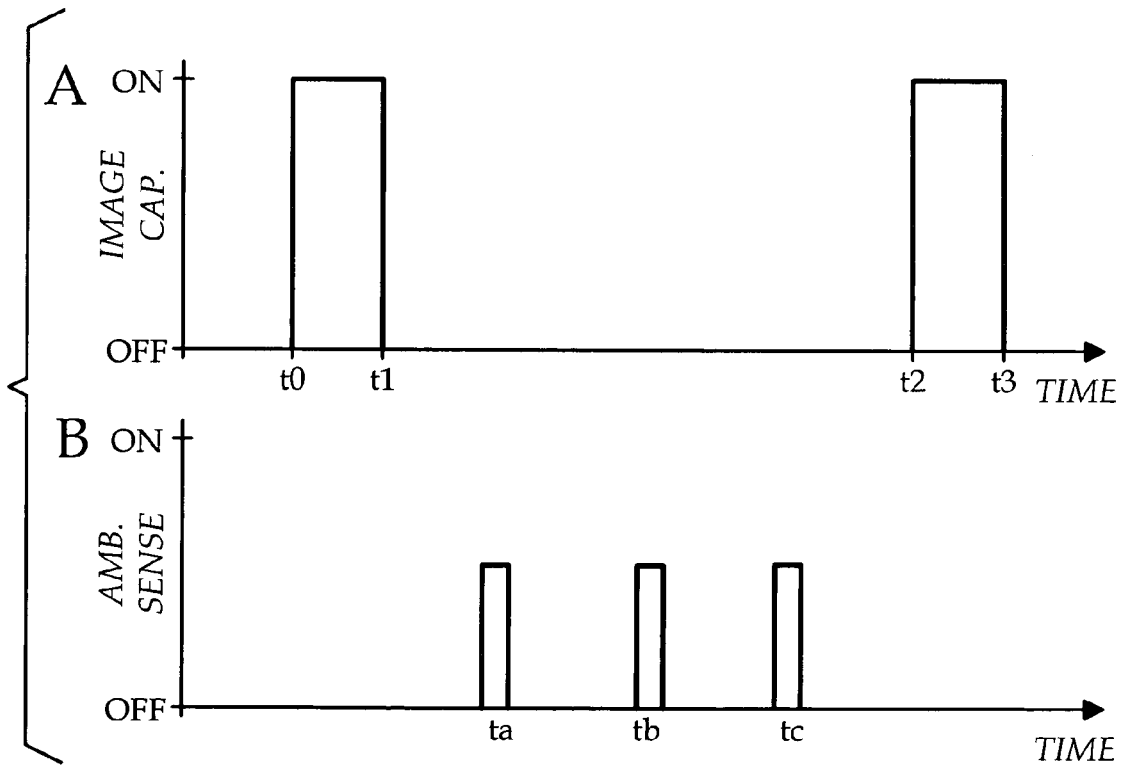
FIG. 3 is a timing diagram for the system of FIG. 1. Graph A depicts the image capture and idle intervals of the solid-state imaging device, and Graph B depicts ambient illumination sampling intervals according to this invention.

A problem with the system of FIGS. 1-2 is that changes in ambient lighting between successive image capture intervals can result in images of insufficient quality for reliable occupant detection and classification. Broadly, the method of the present invention addresses this problem by periodically sampling the ambient light intensity in each idle interval, and using the sampled data to properly set the exposure parameters (gain and integration time) of the imager chip 20*b* for the next image capture interval. In coordination with setting the exposure parameters, the ambient illumination samples are used to determine if active illumination is needed to acquire the next image, and if so, how much. Referring to the timing diagram FIG. 3, Graph A depicts the image capture and idle intervals of imager chip 20*b*, and Graph B depicts ambient illumination sampling intervals that occur during the idle interval. Referring to FIG. 2, the image capture intervals ta, tb and tc occur in the idle interval t1-t2. Of course, the number of illumination sampling intervals within a given idle interval can be different than shown in the illustrated embodiment.

In the illustrated embodiment, ambient illumination in the compartment 12 is sampled with a light sensor 24, which may be packaged with the digital camera 20 if desired. Alternately, several pixels of the imager chip 20*b* can be periodically sampled during the idle intervals to obtain a measure of the ambient illumination, eliminating the expense associated with light sensor 24; also different portions of the field of view can be sampled in this way, with certain portions weighted differently than others. In either case, DSP 22 determines the ambient illumination intensity based on the idle interval samples, and uses the determined intensity along with the supplied active illumination, if any, in a calibrated exposure calculation to provide appropriate settings for the imager gain and integration time. This allows the imager 20*b* to adjust to ambient lighting changes between image capture intervals while preserving the system savings (memory and processing capability) afforded by the low image frame rate.

According to the present invention, the DSP 22 additionally analyses the dynamic range of each captured image in the ensuing idle interval, and compares it with a desired dynamic range. Deviations between the actual dynamic range and the desired dynamic range are noted and used to adaptively adjust the calibration of the imager exposure calculations to compensate for initial error and any errors that occur over time.

An additional aspect of the present invention involves adaptive adjustment of the imager sensitivity based on the sampled ambient illumination, at least in applications where the resolution of the imager 20*b* significantly exceeds the resolution required for occupant sensing applications. For example, sufficient resolution for occupant sensing can be achieved with only one-fourth of the pixels in a standard VGA imager 20*b* having a 640×480 pixel array. In this case, DSP 22 normally acquires image data from a set of pixels that are distributed over the active area of imager 20*b* as illustrated in the pixel diagram of FIG. 4. In the example of FIG. 4, the pixels are grouped in clusters of four, and sufficient resolution for occupant sensing is achieved by using just one pixel in each cluster. The normally used pixels are designated by the reference numeral 26, and the three normally unused pixels in each cluster are designated by the reference numeral 28. The advantage of using only those pixels that are needed for performing occupant sensing is a cost savings associated with reduced memory and processing requirements in DSP 22. According to the present invention, however, the normally unused pixels are selectively used to increase the sensitivity of imager 20*b* while preserving the cost savings associated with using only a fraction of the pixels. This is achieved by selectively reading the intensity data from one or more normally unused pixels disposed in proximity to the normally active pixel, and averaging the intensity data values. When ambient illumination is plentiful, DSP 22 uses only a single pixel 26 per cluster; when ambient illumination is reduced, DSP averages in one or more of the normally unused pixels 28 in each cluster to effectively increase the sensitivity of imager 20*b*. The resolution of the imager 20*b* remains unchanged, but its sensitivity to incident light is increased. This enhances the ability of DSP 22 to obtain a quality image within normal gain and integration time limits, and further minimizes the required activation of light source 14. Of course, the illustration of FIG. 4 is merely exemplary, and various other pixel combinations and cluster sizes are possible depending on the application requirements and the imager resolution. Additionally, the sensitivity does not have to be adjusted uniformly over the entire image; if desired, the normally unused pixels may be selectively utilized to increase sensitivity only in selected regions of the image that are persistently dark (i.e., under-exposed). For example, DSP 22 can use a histogram of the image to identify the presence of localized persistent shadows, and increase the imager sensitivity in only those portions of the image.

Figure 5:
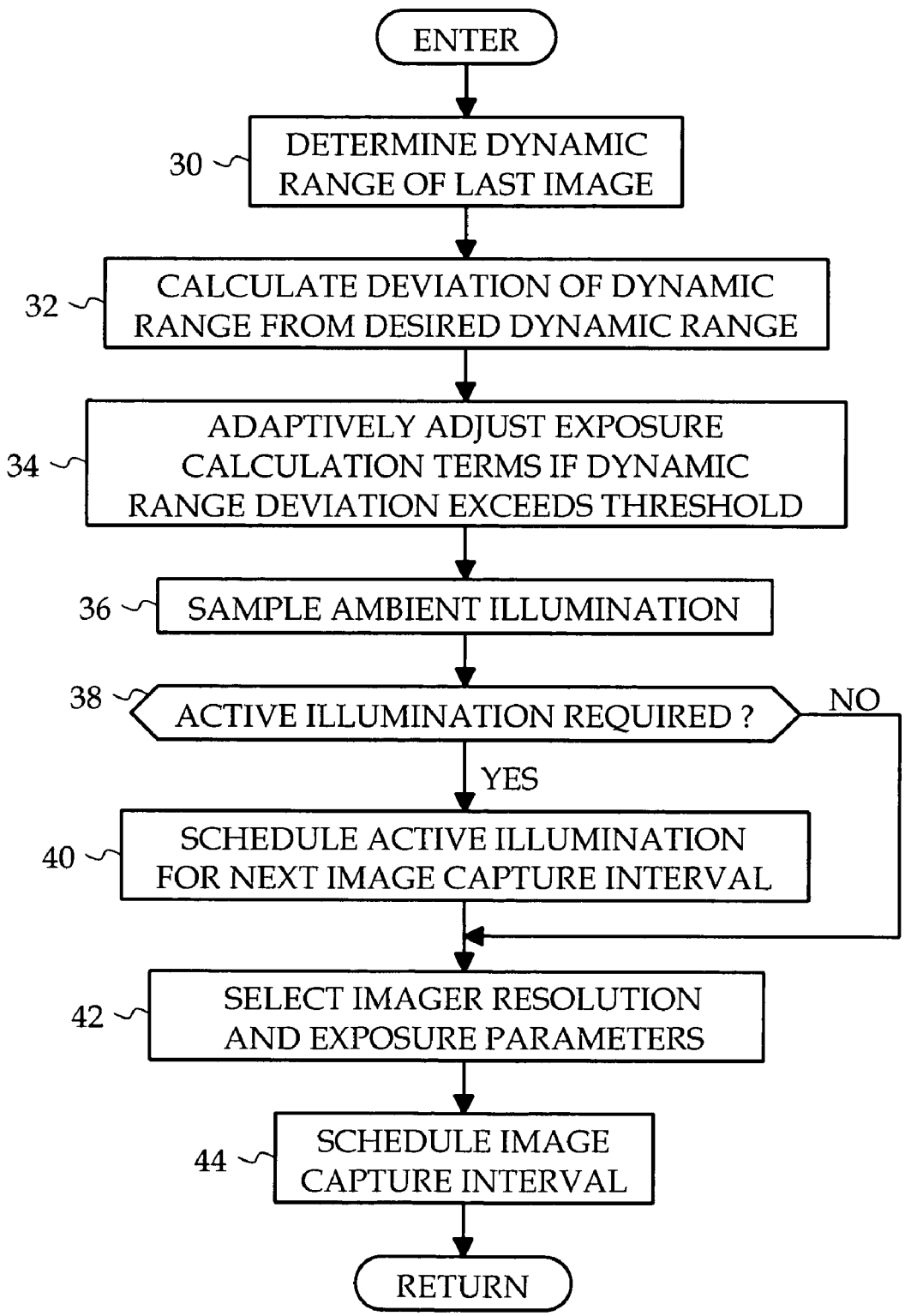
FIG. 5 is a flow diagram representing a software routine executed by the DSP of FIG. 1 according to this invention.

The flow diagram of FIG. 5 represents a software routine executed by DSP 22 after each image capture interval for carrying out the above-described control. The block 30 evaluates the dynamic range achieved in the most recently captured image, by creating and evaluating a histogram for example. The block 32 compares the deviation of the achieved dynamic range with a desired dynamic range for imager 20*b*, and the block 34 adaptively adjusts the calibration terms of the exposure calculations used to determine the exposure settings (gain and integration time) of imager 20*b* for the next image capture interval. Block 36 is then executed to sample the ambient illumination using either light sensor 24 or selected pixels of imager 20*b* as described above. When the ambient sampling is complete, the block 38 determines if active illumination by light source 14 is needed to supplement the existing ambient illumination. If so, the block 40 determines how much active illumination is required, and schedules a corresponding activation of the light source 14 for the next image capture interval. The active illumination can persist for the entire image capture interval, or for just a portion of the image capture interval, as desired. If active illumination is not needed, the block 40 is skipped as shown. The block 42 then sets the imager sensitivity (either globally or regionally based on analysis of the previous image) and uses the predetermined exposure calculations used to determine the exposure settings (gain and integration time) of imager 20*b* for the next image capture interval. The exposure calculations take into account the sampled ambient illumination, the sensitivity, and the level of scheduled active illumination, if any. The block 44 is then executed to schedule the next image capture interval using the determined exposure settings, completing the routine.

In summary, the present invention provides a method of operation for a low frame-rate occupant sensing system including a solid-state imager, where the sensitivity and exposure parameters of the imager are adjusted for each frame based on ambient illumination responsive information obtained in the idle period preceding that frame to produce high quality images with minimized use of active illumination. While the invention has been described in reference to the illustrated embodiment, it should be understood that various modifications in addition to those mentioned above will occur to persons skilled in the art. Accordingly, it is intended that the invention not be limited to the disclosed embodiment, but that it have the full scope permitted by the language of the following claims.

The invention claimed is:

1. A method of operation for vision-based occupant sensing in a vehicle cabin with a solid-state imaging chip, comprising the steps of:

producing image data with said imaging chip during periodic image capture intervals that are separated by idle intervals;

sensing ambient illumination in said cabin during said idle intervals;

setting control parameters of said imaging chip for an upcoming image capture interval based on ambient illumination sensed in an idle period just prior to such upcoming image capture interval;

normally acquiring image data from a set of pixels that are distributed over an active area of said imaging chip, each such pixel being part of a cluster of pixels that also includes normally unused pixels; and based on the sensed ambient illumination, selectively acquiring image data from one or more of the normally unused pixels in said pixel clusters so as to increase sensitivity but not resolution of said imaging chip in said upcoming image capture interval.

2. The method of claim 1, where said control parameters include a gain and an integration time of said imaging chip.

3. The method of claim 1, including the step of actively illuminating said cabin with an active illumination source during said upcoming image capture interval if the ambient illumination sensed in the idle period just prior to such upcoming image capture interval is less than a threshold level.

4. The method of claim 3, where the ambient illumination sensed in the idle period just prior to such upcoming image capture interval is used to control an amount of active illumination during said upcoming image capture interval.

5. The method of claim 1, including the step of:

sensing said ambient illumination in said cabin with an external light sensor.

6. The method of claim 1, including the step of:

acquiring image data from selected pixels of said imaging chip during said idle intervals, and sensing said ambient illumination in said cabin based on such acquired image data.

7. The method of claim 1, including the step of:

in each cluster of pixels, averaging the selectively acquired image data with the normally acquired image data.

8. A method of operation for vision-based occupant sensing in a vehicle cabin with a solid-state imaging chip, comprising the steps of:

producing image data with said imaging chip during periodic image capture intervals that are separated by idle intervals;

sensing ambient illumination in said cabin during said idle intervals;

setting control parameters of said imaging chip for an upcoming image capture interval based on ambient illumination sensed in an idle period just prior to such upcoming image capture interval;

normally acquiring image data from a set of pixels that are distributed over an active area of said imaging chip, each such pixel being part of a cluster of pixels that also includes normally unused pixels;

identifying regions of an image produced from the acquired image data that are persistently underexposed; and selectively acquiring image data from one or more of the normally unused pixels in pixel clusters corresponding to the identified regions of said image so as to locally increase sensitivity but not resolution of said imaging chip in said upcoming image capture interval.

9. The method of claim 8, including the step of:

in each cluster of pixels corresponding to the identified regions of said image, averaging the selectively acquired image data with the normally acquired image data.

* * * * *